United States Patent
Li

(10) Patent No.: US 9,698,447 B2
(45) Date of Patent: Jul. 4, 2017

(54) USE OF LITHIUM BIS(FLUOROSULFONYL) IMIDE (LIFSI) IN NON-AQUEOUS ELECTROLYTE SOLUTIONS FOR USE WITH 4.2V AND HIGHER CATHODE MATERIALS FOR LITHIUM ION BATTERIES

(71) Applicant: BASF Corporation, Florham Park, NJ (US)

(72) Inventor: Wentao Li, Solon, OH (US)

(73) Assignee: BASF Corporation, Florham Park, NJ (US)

(*) Notice: Subject to any disclaimer, the term of this patent is extended or adjusted under 35 U.S.C. 154(b) by 162 days.

(21) Appl. No.: 14/520,251

(22) Filed: Oct. 21, 2014

(65) Prior Publication Data

US 2015/0140446 A1   May 21, 2015

Related U.S. Application Data

(60) Provisional application No. 61/905,729, filed on Nov. 18, 2013.

(51) Int. Cl.

| | | |
|---|---|---|
| H01M 10/0567 | (2010.01) | |
| H01M 10/0525 | (2010.01) | |
| H01M 10/052 | (2010.01) | |
| H01M 4/131 | (2010.01) | |
| H01M 4/505 | (2010.01) | |
| H01M 4/525 | (2010.01) | |
| H01M 4/587 | (2010.01) | |
| H01M 4/62 | (2006.01) | |

(52) U.S. Cl.
CPC ..... *H01M 10/0567* (2013.01); *H01M 10/052* (2013.01); *H01M 10/0525* (2013.01); *H01M 4/131* (2013.01); *H01M 4/505* (2013.01); *H01M 4/525* (2013.01); *H01M 4/587* (2013.01); *H01M 4/622* (2013.01); *H01M 4/623* (2013.01); *H01M 2300/004* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 6,682,855 B2 | 1/2004 | Michot et al. | |
| 2004/0106047 A1 | 6/2004 | Mie et al. | |
| 2006/0240327 A1 | 10/2006 | Xu et al. | |
| 2009/0305145 A1* | 12/2009 | Kim | H01M 10/0525 429/337 |
| 2012/0258357 A1* | 10/2012 | Kim | H01M 6/166 429/199 |
| 2012/0316716 A1 | 12/2012 | Odani et al. | |
| 2013/0260186 A1* | 10/2013 | Schaefer | H01M 10/42 429/49 |
| 2013/0288138 A1 | 10/2013 | Tikhonov et al. | |

OTHER PUBLICATIONS

Allen, Joshua L. et al., 'N-Alkyl-N-methylpyrrolidinium difluoro(oxalato) borate ionic liquids: Physical/electrochemical properties and Al corrosion', Journal of Power Sources, Mar. 14, 2013, vol. 237, pp. 104-111.

* cited by examiner

*Primary Examiner* — Lucas J. O'Donnell
(74) *Attorney, Agent, or Firm* — Shiela A. Loggins

(57) ABSTRACT

This invention relates to electrolytic solutions and secondary batteries containing same. The electrolytic solutions contain lithium bis (fluorosulfonyl) imide and asymmetric borates, asymmetric phosphates and mixtures thereof.

16 Claims, 1 Drawing Sheet

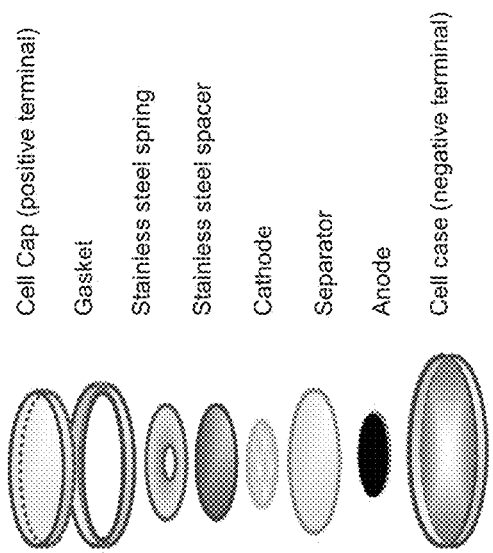

USE OF LITHIUM BIS(FLUOROSULFONYL) IMIDE (LIFSI) IN NON-AQUEOUS ELECTROLYTE SOLUTIONS FOR USE WITH 4.2V AND HIGHER CATHODE MATERIALS FOR LITHIUM ION BATTERIES

TECHNICAL FIELD

The present invention relates to a non-aqueous electrolytic solutions and secondary (rechargeable) electrochemical energy storage devices comprising the same. Such electrolytic solutions enhance electrochemical performance in devices charged to higher voltages, reduce capacity degradation during cycling at these voltages and during high temperature storage and in general improve the overall electrochemical stability of a device made therewith. More specifically the present invention relates to rechargeable batteries that contain one or more cathode active materials that have upper working voltage no less than 4.2V vs $Li^+/Li$, and contain lithium bis(fluorosulfonyl) imide (LIFSI) in the electrolyte.

BACKGROUND

Lithium compound containing electric cells and batteries containing such cells are modern means for energy storage devices. For example, lithium ion batteries have been major power sources for cell phones, laptop computers and a host of other portable electronic consumer products. Penetration of this technology into the transportation market and other large scale applications continues to place ever-increasing demands for higher energy density, higher power density and better cycle life.

Electrolytes for lithium compound containing energy storage devices are mixtures comprised of one or more highly soluble lithium salts and inorganic additives dissolved in one or more organic solvents. Electrolytes are responsible for ionic conduction between the cathode and the anode in the battery and thus essential to the operation of the system. The conventional carbonate-based electrolytes have been successfully applied in commercial 4V lithium ion batteries. Electrolytes having high level performance are desired when the cell operating window is extended to higher potential to avoid decomposition on the highly oxidative surface of charged cathodes. It is also desired that there be improved the interaction between electrolyte and cathode at high voltage.

The use of LiFSI in electrochemical devices is known. LiFSI based electrolytes have high conductivity, thus providing better rate and low temperature performance. However, its application in the battery is limited by its metal corrosion property because metallic material is an essential part of the battery. For example, Al is used as current collector for the positive electrode, and stainless steel may be used as the casing material. It is also known that the use of $LiPF_6$ together with LiFSI may passivize the metal, however, the method has limited effect, especially at high working voltage. There remains a need of method through which LiFSI may be utilized for its beneficial effects in rechargeable battery while not causing, performance degradation to the battery

SUMMARY

This invention relates to non-aqueous electrolyte compositions comprising a) lithium his (fluorosulfonyl) imide and b) a compound selected from the group consisting of asymmetric borates, asymmetric phosphates and mixtures thereof.

An embodiment of this invention is a secondary battery comprising:
   a. an anode,
   b. a cathode containing at least one cathode active material that has a upper working voltage of no less than 4.2V vs. Li+/Li, and,
   c. an electrolytic solution, comprising a non-aqueous electrolytic solvent comprising a) lithium bis(fluorosulfonyl) imide and b) a compound selected from the group consisting of asymmetric borates, asymmetric phosphates and mixtures thereof.

An embodiment of this invention involves electrolytes suitable for use in energy storage devices that operate at voltages greater than 4.2 volts.

An embodiment of this invention involves electrolytes that comprise LiFSI in the amount of 0.1% to 20% of the electrolyte weight.

Another embodiment of this invention involves non-aqueous electrolytic solutions suitable for use in electrochemical energy storage devices capable of being charged to up to 5.0 volts.

Still another embodiment involves non-aqueous electrolytic solutions suitable for use in electrochemical energy storage devices capable of being charged from about 4.2 up to about 5.0 volts.

A further embodiment involves non-aqueous electrolytic solutions suitable for use in electrochemical energy storage devices (e.g., lithium metal batteries, lithium ion batteries, lithium ion capacitors and supercapacitors) that include salts, solvents, Solid Electrolyte Interphase (SEI) formers, Fluorinated compounds, Compounds that promote high temperature stability, as well as performance enhancing additives such as overcharge protection agents, non-flammable agents, anti-swelling agent, and low temperature performance enhancers.

An embodiment provides an electrolytic solution useful in a lithium or lithium-ion batteries.

One more embodiment provides batteries that include an anode and cathode. The major components, including salts, solvents, additives, anodes, and cathodes, are each described in turn herein below.

One additional embodiment provides non-aqueous electrolytic solutions that have high voltage stability during room temperature and high temperature cell cycling as well as good performance under high temperature storage conditions.

BRIEF DESCRIPTION OF THE DRAWINGS

FIG. 1 is an expanded view of one embodiment of a rechargeable battery of the present invention (coin cell).

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Asymmetric Borates. Asymmetric borates suitable for use in this invention include fluorinated asymmetric borates such as lithium difluoro(oxalato)borate, tetraethylammonium difluoro(oxalato)borate, lithium dicyano-difluoroborate, lithium dicyano(oxalato)borate, lithium difluoro(difluoromalonato)borate. The amount of asymmetric borate needed is related to the amount of LiFSI in the battery, such that the ratio of asymmetric borate to LiFSI is between 0.01 to 10. More preferably, the ratio is between 0.1 to 5. Most preferably, the ratio is between 0.2 to 2.

Asymmetric Phosphates. Asymmetric phosphates suitable for use in this invention include fluorinated asymmetric phosphates such as lithium tetrafluoro (oxalato)phosphate, difluoro-bis(oxalato)phosphate, tetraethylammonium tetrafluoro(oxalato)phosphate, lithium dicyano-tetrafluorophosphate, lithium dicyano-bis(oxalato)phosphate. The amount of asymmetric phosphate needed is related to the amount of LiFSI in the battery, such that the ratio of asymmetric phosphate to LiFSI is between 0.01 to 10. More preferably, the ratio is between 0.01 to 5. Most preferably, the ratio is between 0.2 to 2.

Also desirable are asymmetric borates or, asymmetric phosphates containing organic cationic groups such as N,N-diethyl pyrrolidinium difluoro(oxalato)borate The amount of organic cationic containing asymmetric borate or phosphate is related to the amount of LiFSI in the battery, such that the ratio of asymmetric borate or phosphate to LiFSI is between 0.01 to 10. More preferably, the ratio is between 0.1 to 5. Most preferably, the ratio is between 0.2 to 2.

Salts. The solute of the electrolytic solution of the invention contain an ionic salt containing at least one positive ion. Typically this positive ion is lithium (Li+). The salts herein function to transfer charge between the negative electrode and the positive electrode of the battery system. The lithium salts are preferably halogenated, for example, $LiPF_6$, $LiBF_4$, $LiSbF_6$, $LiAsF_6$, $LiTaF_6$, $LiAlCl_4$, $Li_2B_{10}Cl_{10}$, $Li_2B_{10}F_{10}$, $LiClO_4$, $LiCF_3SO_3$, $Li_2B_{12}F_xH_{(12-x)}$ wherein x=0-12; $LiPF_x(RF)_{6-x}$ and $LiBFy(RF)_{4-y}$ wherein RF represents perfluorinated $C_1$-$C_{20}$ alkyl groups or perfluorinated aromatic groups, x=0-5 and y=0-3, $LiBF_2[O_2C(CX_2)_nCO_2]$, $LiPF_2[O_2C(CX_2)_nCO_2]_2$, $LiPF_4[O_2C(CX_2)_nCO_2]$, wherein X is selected from the group consisting of H, F, Cl, $C_1$-$C_4$ alkyl groups and fluorinated alkyl groups, and n=0-4, $LiN(SO_2C_mF_{2m+1})(SO_2C_nF_{2n+1})$, and $LiC(SO_2C_kF_{2k+1})(SO_2C_mF_{2m+1})(SO_2C_nF_{2n+1})$, wherein k=1-10, m=1-10, and n=1-10, respectively, $LiN(SO_2C_pF_{2p}SO_2)$, and $LiC(SO_2C_pF_{2p}SO_2)(SO_2C_qF_{2q+1})$ wherein p=1-10 and q=1-10, lithium salts of chelated orthoborates and chelated orthophosphates such as lithium bis(oxalato)borate [$LiB(C_2O_4)_2$], lithium bis(malonato) borate [$LiB(O_2CCH_2CO_2)_2$], lithium bis(difluoromalonato) borate [$LiB(O_2CCF_2CO_2)_2$], lithium (malonato oxalato) borate [$LiB(C_2O_4)(O_2CCH_2CO_2)$], lithium (difluoromalonato oxalato) borate [$LiB(C_2O_4)(O_2CCF_2CO_2)$], lithium tris(oxalato) phosphate [$LiP(C_2O_4)_3$], and lithium tris(difluoromalonato) phosphate [$LiP(O_2CCF_2CO_2)_3$], and any combination of two or more of the aforementioned salts. Most preferably the electrolytic solution comprises $LiPF_6$ as the ionic salt. The amount of salt is between 5% to 20% of the total electrolyte weight, more preferably, the amount of salt is between 10% to 15% of the total electrolyte weight.

Solvents. The solvents to be used in the secondary batteries of the invention can be any of a variety of non-aqueous, aprotic, and polar organic compounds. Generally, solvents may be carbonates, carboxylates, ethers, lactones, sulfones, phosphates, nitriles, and ionic liquids. Useful carbonate solvents herein include, but are not limited to: cyclic carbonates, such as propylene carbonate and butylene carbonate, and linear carbonates, such as dimethyl carbonate, diethyl carbonate, dipropyl carbonate, dibutyl carbonate, ethyl methyl carbonate, methyl propyl carbonate, and ethyl propyl carbonate. Useful carboxylate solvents include, but are not limited to: methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, and butyl butyrate. Useful ethers include, but are not limited to: tetrahydrofuran, 2-methyl tetrahydrofuran, 1,3-dioxolane, 1,4-dioxane, 1,2-dimethoxyethane, 1,2-diethoxyethane, 1,2-dibutoxyethane, methyl nonafluorobutyl ether, and ethyl nonafluorobutyl ether. Useful lactones include, but are not limited to: γ-butyrolactone, 2-methyl-γ-butyrolactone, 3-methyl-γ-butyrolactone, 4-methyl-γ-butyrolactone, β-propiolactone, and δ-valerolactone. Useful phosphates include, but are not limited to: trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, methyl ethylene phosphate, and ethyl ethylene phosphate. Useful sulfones include, but are not limited to: non-fluorinated sulfones, such as dimethyl sulfone and ethyl methyl sulfone, partially fluorinated sulfones, such as methyl trifluoromethyl sulfone, ethyl trifluoromethyl sulfone, methyl pentafluoroethyl sulfone, and ethyl pentafluoroethyl sulfone, and fully fluorinated sulfones, such as di(trifluoromethyl) sulfone, di(pentafluoroethyl) sulfone, trifluoromethyl pentafluoroethyl sulfone, trifluoromethyl nonafluorobutyl sulfone, and pentafluoroethyl nonafluorobutyl sulfone. Useful nitriles include, but are not limited to: acetonitrile, propionitrile, butyronitrile and dinitriles, $CN[CH_2]_nCN$ with various alkane chain lengths (n=1-8). An ionic liquid (IL) is a salt in the liquid state. In some contexts, the term has been restricted to salts whose melting point is below some arbitrary temperature, such as 100° C. (212° F.). ILs are largely made of ions and short-lived ion pairs. Common anions of ILs are TFSi, FSi, BOB, $PF_{6-x}R_x$, $BF_4$, etc and cations of ILs are imidazolium, piperidinium, pyrrolidinium, tetraalkylammonium, morpholinium, etc. Useful ionic liquids include, but not limited to: Bis(oxalate)borate (BOB) anion based ionic liquids, such as N-cyanoethyl-N-methylprrrolidinium BOB, 1-methyl-1-(2-methylsulfoxy) ethyl)-pyrrolidinium BOB, and 1-methyl-1-((1,3,2-dioxathiolan-2-oxide -4-yl)methyl)pyrrolidinium BOB; tris (pentafluoroethyl)trifluorophosphate (FAP) anion based ionic liquids, such as N-allyl-N-methylpyrrrolidinium FAP, N-(oxiran-2-ylmethyl)N-methylpyrrolidinium FAP, and N-(prop-2-inyl)N-methylpyrrolidinium FAP; bis(trifluoromethanesulfonyl)imide (TFSI) anion-based ionic liquids, such as N-propyl-N-methylpyrrolidinium TFSI, 1,2-dimethyl-3-propylimidazolium TFSI, 1-octyl-3-methyl-imidazolium TFSI, and 1-butyl-methylpyrrolidinium TFSI; Bis (fluorosulfonyl)imide (FSI) anion-based ionic liquids, such as N-Butyl-N-methylmorpholinium FSI and N-propyl-N-methylpiperidinium FSI; and other ionic liquids such as 1-ethyl-3-methylimidazolium tetrafluoroborate. Two or more of these solvents may be used in the electrolytic solution. Other solvents may be utilized as long as they are non-aqueous and aprotic, and are capable of dissolving the salts, such as N,N-dimethyl formamide, N,N-dimethyl acetamide, N,N-diethyl acetamide, and N,N-dimethyl trifluoroacetamide. Carbonates are preferred, with the most preferred being ethylene carbonate (EC), ethyl methyl carbonate (EMC) and mixtures thereof. The amount of solvent is between 70% to 95% of the total electrolyte weight, more preferably, the amount of salt is between 80% to 90% of the total electrolyte weight.

Solid Electrolyte Interphase (SEI) formers. SEI formers are materials that can be reductively decomposed on surfaces of negative electrodes prior to other solvent components to form protective films that suppress excessive decomposition of the electrolytic solutions. SEI has important roles on the chargedischarge efficiency, the cycle characteristics and the safety of nonaqueous electrolyte batteries. Generally, SEI formers can include, but not limited to, vinylene carbonate and its derivatives, ethylene carbonate derivatives having non-conjugated unsaturated bonds in their side chains, halogen atom-substituted cyclic carbonates and salts of chelated orthoborates and chelated orthophosphates. Specific examples of SEI additives include vinylene carbonate(VC), vinylethylene carbonate (VEC), methylene ethylene carbonate (or 4-vinyl-1,3-dioxolan-2-one) (MEC), monofluoroethylene carbonate (FEC), Chloroethylene carbonate (CEC), 4,5-divinyl-1,3-dioxolan-2-one, 4-methyl-5-vinyl-1,3-dioxolan-2-one, 4-ethyl-5-vinyl-1,3-dioxolan-2-one, 4-propyl-5-vinyl-1,3-dioxolan-2-one, 4-butyl-5-vinyl-1,3-dioxolan-2-one, 4-pentyl-5-vinyl-1,3-dioxolan-2-one, 4-hexyl-5-vinyl-1,3-dioxolan-2-one, 4-phenyl-5-vinyl-1,3-dioxolan-2-one, 4,4-difluoro-1,3-dioxolan-2-one and 4,5-difluoro-1,3-dioxolan-2-one, lithium bis(oxalate)borate (LiBOB), lithium bis(malonato)borate (LiBMB), lithium bis (difluoromalonato)borate (LiBDFMB), lithium (malonato oxalato)borate (LiMOB), lithium (difluoromalonato oxalato)borate (LiDFMOB), lithium tris(oxalato)phosphate (LiTOP), and lithium tris(difluoromalonato)phosphate (LiTDFMP). Particularly useful solid electrolyte interphase formers are selected from the group consisting of vinylene carbonate, monofluoroethylene carbonate, methylene ethylene carbonate, vinyl ethylene carbonate, lithium bis(oxalate) borate and mixtures thereof. The amount of SEI former is between 0.1% to 8% of the total electrolyte weight, more preferably, the amount of SEI former is between 1% to 5% of the total electrolyte weight.

Fluorinated compounds. Fluorinated compounds can include organic and inorganic fluorinated compounds. Each provided in an amount of 0 to 50% by weight of the electrolyte solution.

Organic fluorinated compounds—Compounds in the organic family of fluorinated compounds can include fluorinated carbonates, fluorinated ethers, fluorinated esters, fluorinated alkanes, fluorinated alkyl phosphates, fluorinated aromatic phosphates, fluorinated alkyl phosphonates, and fluorinated aromatic phosphonates. Exemplary organic fluorinated compounds include fluorinated alkyl phosphates, such as tris(trifluoroethyl)phosphate, tris(1,1,2,2-tetrafluoroethyl) phosphate, tris(hexafluoro-isopropyl)phosphate, (2,2,3,3-tetrafluoropropyl) dimethyl phosphate, bis(2,2,3,3-tetrafluoropropyl) methyl phosphate, and tris(2,2,3,3-tetrafluoropropyl) phosphate; fluorinated ethers, such as 3-(1,1,2,2-tetrafluoroethoxy)-(1,1,2,2-tetrafluoro)-propane, pentafluoropropyl methyl ether, pentafluoropropyl fluoromethyl ether, pentafluoropropyl trifluoromethyl ether, 4,4,4,3,3,2,2-heptafluorobutyl difluoromethyl ether, 4,4,3,2,2-pentafluorobutyl 2,2,2-trifluoroethyl ether, 2-difluoromethoxy-1,1,1-trifluoroethane, and 2-difluoromethoxy-1,1,1,2-tetrafluoroethane; fluorinated carbonates, such as fluoroethylene carbonate, bis(fluoromethyl) carbonate, bis (fluoroethyl) carbonate, fluoroethyl fluoromethyl carbonate, methyl fluoromethyl carbonate, ethyl fluoroethyl carbonate, ethyl fluoromethyl carbonate, methyl fluoroethyl carbonate, bis(2,2,2-trifluoroethyl) carbonate, 2,2,2-trifluoroethyl methyl carbonate, fluoroethylene carbonate, and 2,2,2-trifluoroethyl propyl carbonate. Also suitable are fluorinated esters, such as (2,2,3,3-tetrafluoropropyl) formate, methyl trifluoroacetate, ethyl trifluoroacetate, propyl trifluoroacetate, trifluoromethyl trifluoroacetate, trifluoroethyl trifluoroacetate, perfluoroethyl trifluoroacetate, and (2,2,3,3-tetrafluoropropyl) trifluoroacetate; fluorinated alkanes, such as n-$C_4F_9C_2H_5$, n-$C_6F_{13}C_2H_5$, or n-$C_8F_{16}H$; fluorinated aromatic phosphates, such as tris(4-fluorophenyl) phosphate and pentafluorophenyl phosphate. Fluorinated alkyl phosphonate, such as trifluoromethyl dimethylphosphonate, trifluoromethyl di(trifluoromethyl)phosphonate, and (2,2,3,3-tetrafluoropropyl) dimethylphosphonate; fluorinated aromatic phosphonate, such as phenyl di(trifluoromethyl) phosphonate and 4-fluorophenyl dimethylphosphonate, are suitable. Combinations of two or more of any of the foregoing are also suitable.

Inorganic fluorinated compounds—Compounds in the inorganic family of fluorinated compounds include lithium salts of fluorinated chelated orthoborates, fluorinated chelated orthophosphates, fluorinated imides, fluorinated sulfonates. Exemplary inorganic fluorinated compounds include $LiBF_2C_2O_4$ (LiDFOB), $LiPF_4(C_2O_4)$ (LiTFOP), $LiPF_2(C_2O_4)_2$ (LiDFOP), $LiN(SO_2CF_3)_2$ (LiTFSI), $LiN(SO_2F)_2$ (LiFSI), $LiN(SO_2C_2F_5)_2$ (LiBETI), $LiCF_3SO_3$, $Li_2B_{12}F_xH_{(12-x)}$ where $0<x \leq 12$ and combinations of two or more thereof.

Compounds that promote high temperature stability. When batteries are operated or stored at 55° C. or above, they tend to have poor capacity retention and swelling phenomenon due to gas generation that results from decomposition of the electrolyte at the cathode. This reduced performance becomes more evident when a cell is charged to higher voltages. High temperature stabilizers can enhance charge-discharge characteristics of batteries and effectively reduce the swelling of batteries at elevated temperatures. They can also help to create a protective layer on the surface of the cathode which will further decrease the amount of solvent oxidation and decomposition at the cathode. Compounds that promote high temperature stability typically include: sulfur-containing linear and heterocyclic, unsaturated and saturated compounds; phosphorus containing linear and heterocyclic, unsaturated and saturated compounds; and compounds that act as HF scavengers.

Sulfur containing compounds include linear and cyclic compounds such as sulfites, sulfates, sulfoxides, sulfonates, thiophenes, thiazoles, thietanes, thietes, thiolanes, thiazolidines, thiazines, sultones, and sulfones. These sulfur containing compounds can include various degrees of fluorine substitution up to and including the fully perfluorinated compounds. Specific examples of sulfur-containing linear and cyclic compounds include ethylene sulfite, ethylene sulfate, thiophene, benzothiophene, benzo[c]thiophene, thiazole, dithiazole, isothiazole, thietane, thiete, dithietane, dithiete, thiolane, dithiolane, thiazolidine, isothiazolidine, thiadiazole, thiane, thiopyran, thiomorpholine, thiazine, dithiane, dithiine; thiepane; thiepine; thiazepine; prop-1-ene-1,3-sultone; propane-1,3-sultone; butane-1,4-sultone; 3-hydroxy-1-phenylpropanesulfonic acid 1,3-sultone; 4-hydroxy-1-phenylbutanesulfonic acid 1,4-sultone; 4-hydroxy-1-methylbutanesulfonic acid 1,4 sultone; 3-hydroxy-3-methylpropanesulfonic acid 1,4-sultone; 4-hydroxy-4-methylbutanesulfonic acid 1,4-sultone; a sulfone having the formula $R_1(=S(=O)_2)R_2$ where $R_1$ and $R_2$ are independently selected from the group consisting of substituted or unsubstituted, saturated or unsaturated $C_1$ to $C_{20}$ alkyl or aralkyl groups; and combinations of two or more thereof. In a specific embodiment the sulfur containing compounds (are selected from the group consisting propane-1,3-sultone, butane-1,4-sultone and prop-1-ene-1,3-sultone, each provided in an amount of 0.1 to 5.0% by weight of the electrolyte solution.

Phosphorus containing compounds include linear and cyclic, phosphates and phosphonates. Representative examples of the phosphorus containing compounds include: alkyl phosphates, such as trimethylphosphate, triethylphosphate, triisopropyl phosphate, propyl dimethyl phosphate, dipropyl methyl phosphate, and tripropyl phosphate; aromatic phosphates, such as triphenyl phosphate; alkyl phosphonates include trimethylphosphonate, and propyl dimethylphosphonate; and aromatic phosphonates, such as phenyl dimethylphosphonate. Combinations of any of the foregoing are also suitable. The amount of phosphorus containing compounds is between 0.1% to 5% of the total electrolyte weight, more preferably, the amount of phosphorus containing compounds is between 1% to 4% of the total electrolyte weight.

Compounds that promote high temperature stability also include additives that work as a HF scavenger to prevent battery capacity deterioration and improve output characteristics at high temperatures, including acetamides, anhydrides, Pyridines, tris(trialkylsilyl)phosphates, tris(trialkylsilyl)phosphites, tris(trialkylsilyl)borates. Examples of HF scavenger-type high temperature stabilizers include: acetamides such as, N,N-dimethyl acetamide, and 2,2,2-trifluoroacetamide; anhydrides such as phthalic anhydride succinic anhydride, and glutaric anhydride; pyridines such as antipyridine and pyridine; tris(trialkylsilyl)phosphates such as tris(trimethylsilyl)phosphate and tris(triethylsilyl)phosphate; tris(trialkylsilyl)phosphites tris(trimethylsilyl)phosphite, tris(triethylsilyl)phosphite, tris(tripropylsilyl)phosphit; tris(trialkylsilyl)borates such as, tris(trimethylsilyl)borate, tris(triethylsilyl)borate, and tris(tripropylsilyl)borate; alone or as a mixture of two or more thereof. The amount of compounds that promote high temperature stability is between 0.1% to 5% of the total electrolyte weight, more preferably, the amount of compounds that promote high temperature stability is between 1% to 4% of the total electrolyte weight.

An embodiment of this invention includes a secondary electrochemical energy storage device comprising:
  a. ethylene carbonate, dimethyl carbonate and ethylmethyl carbonate;
  b. $LiPF_6$;
  c.; lithium bis (fluorosulfonyl) imide and
  d. at least one of lithium difluoro(oxalato)borate and lithium tetrafluoro oxalato-phosphate.

Anodes. The anode material is selected from lithium metal, lithium alloys, carbonaceous materials, and lithium metal oxides capable of being intercalated and de-intercalated with lithium ions. Carbonaceous materials useful herein include graphite, amorphous carbon, and other carbon materials such as activated carbon, carbon fiber, carbon black, and mesocarbon microbeads. Lithium metal anodes may be used. Lithium MMOs (mixed-metal oxides) such as $LiMnO_2$ and $Li_4Ti_5O_{12}$ are also envisioned. Alloys of lithium with transition or other metals (including metalloids) may be used, including LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, and combinations thereof. The anode may further comprise an additional material such as a metal oxide including SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof. Silicon may also be used.

Cathodes. The cathode comprises at least one lithium transition metal oxide (LiMO), lithium transition metal phosphate ($LiMPO_4$), or lithium transition metal fluorosilicate ($LiMSiO_xF_y$). Lithium transition metal oxides contain at least one metal selected from the group consisting of Mn, Co, Cr, Fe, Ni, V, and combinations thereof. For example, the following LiMOs may be used in the cathode: $LiCoO_2$, $LiMnO_2$, $LiMn_2O_4$, $Li_2Cr_2O_7$, $Li_2CrO_4$, $LiNiO_2$, $LiFeO_2$, $LiNi_xCo_{1-x}O_2$ (0<x<1), $LiMn_zNi_{1-z}O_2$ (0<z<1) (which includes $LiMn_{0.5}Ni_{0.5}O_2$), $LiMn_{1/3}Co_{1/3}Ni_{1/3}O_2$, $LiMc_{0.5}Mn_{1.5}O_4$, wherein Mc is a divalent metal, and $LiNi_xCo_yMe_zO_2$ wherein Me may be one or more of Al, Mg, Ti, B, Ga, or Si and 0<x,y,z<1. Lithium transition metal phosphate ($LiMPO_4$) such as $LiFePO_4$, $LiVPO_4$, $LiMnPO_4$, $LiCoPO_4$, $LiNiPO_4$, $LiMn_xMc_yPO_4$, where Mc may be one of or of Fe, V, Ni, Co, Al, Mg, Ti, B, Ga, or Si and 0<x,y<1. Furthermore, transition metal oxides such as $MnO_2$ and $V_2O_5$, transition metal sulfides such as $FeS_2$, $MoS_2$, and $TiS_2$, and conducting polymers such as polyaniline and polypyrrole may be present. The preferred positive electrode material is the lithium transisition metal oxide, especially, $LiCoO_2$, $LiMn_2O_4$, $LiNi_{0.80}Co_{0.15}Al_{0.05}O_2$, $LiFePO_4$, $LiMnPO_4$, and $LiNi_{1/3}Mn_{1/3}Co_{1/3}O_2$. The stoichiometry of elements in the above molecular formulations does not need to be integral. For example, the material could be lithium rich or lithium deficient, that is, the lithium number in the above formula could be larger or smaller than integral so that it becomes (integral ±0.1). For example. $Li_{0.95}Mn_2O_4$, $Li_{1.1}Ni_{1/3}Mn_{1/3}Co_{1/3}O_2$. Mixtures of such oxides may also be used.

Either the anode or the cathode, or both, may further comprise a polymeric binder. In the preferred embodiment, the binder may be polyvinylidene fluoride, styrene-butadiene rubber, alkali metal salts of carboxymethyl cellulose, alkali metal salts of polyacrylic acid, polyamide or melamine resin, or combinations of two or more thereof.

Further additions to the electrolytic solution may include, but are not limited to, one or more of the following performance enhancing additives: overcharge protection agent, non-flammable agents, anti-swelling agent, low temperature performance enhancers. Examples of such compounds include biphenyl, iso-propyl benzene, hexafluorobenzene, phosphazenes, organic phosphates, organic phosphonates, and alkyl and aryl siloxanes, The total concentration of such additives in the solution preferably does not exceed about 5 wt %.

Certain embodiments of the invention are envisioned where at least some percentages, temperatures, times, and ranges of other values are preceded by the modifier "about." "Comprising" is intended to provide support for "consisting of" and "consisting essentially of." Where ranges in the claims of this provisional application do not find explicit support in the specification, it is intended that such claims provide their own disclosure as support for claims or teachings in a later filed non-provisional application. Numerical ranges of ingredients that are bounded by zero on the lower end (for example, 0-10 vol % VC) are intended to provide support for the concept "up to [the upper limit]," for example "up to 10 vol % VC," vice versa, as well as a positive recitation that the ingredient in question is present in an amount that does not exceed the upper limit. An example of the latter is "comprises VC, provided the amount does not exceed 10 vol %." A recitation such as "8-25 vol % (EC+MEC+VC)" means that any or all of EC, MEC and/or VC may be present in an amount of 8-25 vol% of the composition.

Examples of the Invention

Preparation of a Cathode. A positive electrode slurry is prepared by dispersing $LiNiCoMnO_2$ (as positive electrode active material, 93 wt %), poly(vinylidenfluoride) (PVdF) (as binder, 4 wt %), and acetylene black as electro-conductive agent, 4 wt % into 1-methyl-2-pyrrolidone (NMP). The slurry is coated on aluminum foil, dried, and compressed to give a positive electrode sheet. Circular disks of 0.5 inch diameter are then punched out to be the working positive electrode.

Preparation of an Anode. Natural graphite (as negative electrode active material, 95 wt %) and carboxymethyl cellulose-styrene butadiene rubber (CMC-SBR) (as binder, 5 wt %) are mixed into water to give a negative active material slurry which is coated on copper foil, dried, and pressed to give a negative electrode sheet. Circular disks of 0.75 inch diameter are then punched out to be the working negative electrode.

Preparation of Electrolytic Solutions. The Baseline Electrolytic solution is prepared by dissolving $LiPF_6$ into EC and EMC solvent mixture so that the $LiPF_6$ concentration is 1 mol/L and the EC/EMC ratio is 3/7 by volume. 1% LiFSI and 0.5% LiDFOB (by weight) are added into the baseline solution.

Assembly of Lithiun Ion Battery. A coin-type lithium ion battery as shown in FIG. I was assembled inside a $N_2$ filled glove box. The negative electrode, glass separator and positive electrode are stacked on top of each other and are sealed into the battery casing with other components as shown. This battery is referred to as Battery Example 1.

The battery thus obtained was charged and discharged at room temperature. The nominal capacity of the battery is 2.5 mAh. The charge is first under constant current of C/10 to 4.2V. If the cell can't reach maximum voltage of 4.2V, it means corrosion happened in the charging stage; if the cell can reach this maximum voltage of 4.2V, then the cell charging is continued under constant voltage at 4.2V until the charge current is less than 0.11 mA. The cell is allowed to rest for 10 minutes, and then discharged at C/10 to 2.8V. If the cell has a smooth discharge voltage and current profile, the cell has no metal corrosion problem and the cell can be fully discharged and charged again; otherwise, metal conosion happens. In the occurrence of metal corrosion, the cell would have significantly lower capacity in the following charge and discharge process.

Battery Examples 2-6 are assembled the same way as in Example 1 except different additives and the concentration of LiFSI' and the additives used are different, as shown in table I.

Table I shows if the battery can reach the maximum voltage of 4.2V and then if metal corrosion happened at the first discharge.

Battery comparison 19 shows that when LiFSI is present, metal corrosion happens and the battery can't reach 4.2V.

Battery examples 1-3 indicate that when LiFSI concentration is at 1%, even 0.5% of LiDFOB is enough to protect the metal.

Battery examples 4-6 indicate that when LiFSI concentration is at 3%, more than 0.5% of LiDFOB is needed to protect the metal.

Battery comparisons 1-6 show that when Li BOB is used, 2% of LiBOB is not able to protect the metal even when only 1% LiFSI is used. The dfference between LiBOB and LiDFOB is surprising, considering that LiBOB is known to have more film forming capability.

Battery comparisons 7-12 show that VC can't protect the metal no matter the concentration, despite that VC is well known to form film on both positive and negative electrodes.

Battery comparisons 13-23 show that other additives used in the battery for film forming, overcharge, high voltage, flame retardant etc., as MEC, VEC, 1,3-propane sultone (PS), succinonitrile (SN), biphenyl (BP), and FEC, (1,1,2,2)-tetrafluoro-3-(1,1,2,2-tetrafluoroethoxy)-propane (FE1), ethylpentafluorocyclotriphosphazene (PE1) and $LiBF_4$, cannot protect the metal.

TABLE 1

Result of the battery examples and battery comparisons.

|  | LiFSI weight % | Corrosion Inhibition Additive | Additive weight % | Maximum Voltage Reached (>=4.2 V) | Metal Corrosion at the First Discharge? |
|---|---|---|---|---|---|
| Battery Example 1 | 1 | LiDFOB | 0.5 | Y | N |
| Battery Example 2 | 1 | LiDFOB | 1 | Y | N |
| Battery Example 3 | 1 | LiDFOB | 2 | Y | N |
| Battery Example 4 | 3 | LiDFOB | 0.5 | N | N/A |
| Battery Example 5 | 3 | LiDFOB | 1 | Y | N |
| Battery Example 6 | 3 | LiDFOB | 2 | Y | N/A |
| Battery Comparison 1 | 1 | LiBOB | 0.5 | N | N/A |
| Battery Comparison 2 | 1 | LiBOB | 1 | N | N/A |
| Battery Comparison 3 | 1 | LiBOB | 2 | Y | Y |
| Battery Comparison 4 | 3 | LiBOB | 0.5 | N | N/A |
| Battery Comparison 5 | 3 | LiBOB | 1 | N | N/A |
| Battery Comparison 6 | 3 | LiBOB | 2 | N | N/A |
| Battery Comparison 7 | 1 | VC | 0.5 | N | N/A |

TABLE 1-continued

Result of the battery examples and battery comparisons.

| | LiFSI weight % | Corrosion Inhibition Additive | Additive weight % | Maximum Voltage Reached (>=4.2 V) | Metal Corrosion at the First Discharge? |
|---|---|---|---|---|---|
| Battery Comparison 8 | 1 | VC | 1 | N | N/A |
| Battery Comparison 9 | 1 | VC | 2 | N | N/A |
| Battery Comparison 10 | 3 | VC | 0.5 | N | N/A |
| Battery Comparison 11 | 3 | VC | 1 | N | N/A |
| Battery Comparison 12 | 3 | VC | 2 | N | N/A |
| Battery Comparison 13 | 1 | MEC | 2 | N | N/A |
| Battery Comparison 14 | 1 | VEC | 2 | N | N/A |
| Battery Comparison 15 | 1 | PS | 2 | N | N/A |
| Battery Comparison 16 | 1 | SN | 2 | Y | Y |
| Battery Comparison 17 | 1 | BP | 2 | N | N/A |
| Battery Comparison 18 | 1 | FEC | 2 | N | N/A |
| Battery Comparison 21 | 1 | FE1 | 2 | N | N/A |
| Battery Comparison 22 | 1 | PE1 | 2 | N | N/A |
| Battery Comparison 23 | 1 | LiBF4 | 2 | N* | Y |

Y = yes,
N = no,
N/A = not applicable.
*one of the cells reached 4.2 V, but has irregular capacity.

What is claimed is:

1. non-aqueous electrolyte composition comprising a) lithium bis (fluorosulfonyl) imide and b) a compound selected from the group consisting of asymmetric borates, asymmetric phosphates and mixtures thereof, wherein the weight ratio of b) to a) ranges from about 0.2 to about 2.

2. A non-aqueous electrolyte composition according to claim 1 wherein the asymmetric borate is selected from the group consisting of lithium difluoro(oxalato)borate, $LiBF_y(R_F)_{4-y}$, wherein $R_F$ represents perfluorinated $C_1$-$C_{20}$ alkyl groups or perfluorinated aromatic groups, and y=0-3, $LiBF_2[O_2C(CX_2)_nCO_2]$, wherein X is selected from the group consisting of H, F, Cl, $C_1$-$C_4$ alkyl groups and fluorinated alkyl groups, and n=0-4 and mixtures thereof.

3. The non-aqueous electrolyte composition according to claim 1 wherein the asymmetric phosphates are selected from the group consisting of lithium tetrafluoro oxalato-phosphate, $LiPF_x(R_F)_{6-x}$, wherein $R_F$ represents perfluorinated $C_1$-$C_{20}$ alkyl groups or perfluorinated aromatic groups, x=0-5, $LiPF_2[O_2C(CX_2)_nCO_2]_2$, $LiPF_4[O_2C(CX_2)_nCO_2]$, wherein X is selected from the group consisting of H, F, Cl, $C_1$-$C_4$ alkyl groups and fluorinated alkyl groups, and n=0-4 and mixtures thereof.

4. The non-aqueous electrolyte composition according to claim 1, wherein the asymmetric borates or asymmetric phosphates contain an organic cationic group.

5. A secondary battery comprising: a. an anode, b. a cathode containing at least one cathode active material that has an upper working voltage of no less than 4.2V vs. Li+/Li, and, c. an electrolytic solution, comprising a non-aqueous electrolytic solvent comprising a) lithium his (fluorosulfonyl) imide and b) a compound selected from the group consisting of asymmetric borates, asymmetric phosphates and mixtures thereof, wherein the weight ratio of b) to a) ranges from about 0.2 to about 2.

6. The secondary battery of claim 5, wherein the asymmetric borates are selected from the group consisting of lithium difluoro(oxalato)borate, tetraethylammonium difluoro(oxalato)borate, N,N-diethyl pyrrolidinium difluoro (oxalato)borate and mixtures thereof and the asymmetric phosphates is lithium tetrafluoro oxalato-phosphate.

7. The secondary battery of claim 5, wherein the electrolytic solution further comprises a salt selected from the group consisting of LiPF6, $LiBF_4$, $LiSbF_6$, $LiAsF_6$, $LiTaF_6$, $LiAlCl_4$, $Li_2B_{10}Cl_{10}$, $Li_2B_{12}F_xH_{(12-x)}$ wherein x=0-12, $LiB(C_2O_4)_2$, $LiB(O_2CCH_2CO_2)_2$, $LiB(O_2CCF_2CO_2)_2$, $LiB(C_2O_4)(O_2CCH_2CO_2)$, $LiB(C_2O_4)(O_2CCF_2CO_2)$, $LiP(C_2O_4)_3$, $LiP(O_2CCF_2CO_2)_3$, $LiClO_4$, $LiCF_3SO_3$; $LiN(SO_2C_mF_{2m+1})(SO_2C_nF_{2n+1})$Li $C(SO_2C_kF_{2k+1})$ $(SO_2C_mF_{2m+1})(SO_2C_nF_{2n+1})$, wherein k=1-10, m=1-10, and n=1-10, respectively; $LiN(SO_2C_pF_{2p}SO_2)$, and $LiC(SO_2C_pF_{2p}SO_2)(SO_2C_qF_{2q+1})$ wherein p=1-10 and q=1-10; and combinations thereof.

8. The secondary battery of claim 5, wherein the cathode comprises a lithium mixed metal oxide selected from the group consisting of $LiCoO_2$, $LiMnO_2$, $LiMn_2O_4$, $Li_2Cr_2O_7$, $Li_2CrO_4$, $LiNiO_2$, $LiFeO_2$, $LiNi_xCo_{1-x}O_2(0<x<1)$, $LiFePO_4$, $LiVPO_4$, $LiMnPO_4$, $LiNiPO_4$, $LiMn_{0.5}Ni_{0.5}O_2$, $LiMn_{1/3}Co_{1/3}Ni_{1/3}O_2$, $LiNi_xCo_yMe_zO_2$ wherein Me may be one or more of Al, Mg, Ti, B, Ga, or Si and combinations thereof, and 0<x,y,z<1, and $LiMc_{0.5}Mn_{1.5}O_4$ wherein Mc is a divalent metal, and mixtures thereof.

9. The secondary battery of claim 5, wherein the electrolytic solution further comprises a non-aqueous solvent selected from the group consisting of ethylene carbonate, propylene carbonate, butylene carbonate, dimethyl carbonate, diethyl carbonate, di(2,2,2-trifluoroethyl) carbonate, dipropyl carbonate, dibutyl carbonate, ethyl methyl carbonate, 2,2,2-trifluoroethyl methyl carbonate, methyl propyl carbonate, ethyl propyl carbonate, 2,2,2-trifluoroethyl propyl carbonate, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, tetrahydrofuran, 2-methyl tetrahydrofuran, 1,3-dioxolane 1,4-dioxane, 1,2-dimethoxyethane, 1,2-diethoxyethane, 1,2-dibutoxyethane, acetonitrile, dimethylformamide, gamma-butyrolactone, 2-methyl-gamma-butyrolactone, 3-methyl-gamma-butyrolactone, 4-methyl-gamma-butyrolactone, beta -propiolactone, delta-valerolactone, trimethyl phosphate, triethyl phosphate, tris(2-chloroethyl)phosphate, tris(2,2,2-trifluoroethyl) phosphate, tripropyl phosphate, triisopropylphosphate, tributyl phosphate, trihexyl phosphate, triphenyl phosphate, tritolyl phosphate, methyl ethylene phosphate, ethyl ethylene phosphate, dimethylsulfone, ethyl methyl sulfone, methyl trifluoromethyl sulfone, ethyltrifluoromethyl sulfone, methyl pentafluoroethyl sulfone, ethyl pentafluoroethylsulfone, di(trifluoromethyl) sulfone, di(pentafluoroethyl) sulfone, trifluoromethylpentafluoroethyl sulfone, trifluoromethyl nonafluorobutyl sulfone, pentafluoroethyl nonafluorobutyl sulfone, acetonitrile, propionitrile, butyronitrile N,N-dimethyl formamide, N,N-dimethyl acetamide, N,N-diethyl acetamide, N,N-dimethyltrifluoroacetamide and combinations thereof.

10. The secondary battery of claim 5, wherein the cathode further comprises a binder selected from the group consisting of polyvinylidene fluoride, styrene-butadiene rubber, polyamide, melamine, and combinations thereof.

11. The secondary battery of claim 5, wherein the anode comprises a material selected from the group consisting of carbonaceous material, lithium metal, $LiMnO_2$, LiAl, LiZn, $Li_3Bi$, $Li_3Cd$, $Li_3Sd$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, $Li_4Ti_5O_{12}$, Si or SiOx, x=0-3, and combinations thereof.

12. The secondary battery of claim 5, wherein the anode further comprises a binder selected from the group consisting of polyvinylidene fluoride, styrene-butadiene rubber, cellulose, polyamide, melamine, and combinations thereof.

13. The secondary battery of claim 5, wherein the electrolytic solution further comprises a salt selected from the group consisting of $LiPF_6$; $LiBF_4$, and combinations thereof.

14. The secondary battery of claim 5, wherein the non-aqueous electrolytic solution comprises: a. ethylene carbonate, dimethyl carbonate and ethylmethyl carbonate; b. $LiPF_6$; c.; lithium bis (fluorosulfonyl) imide and d. at least one of lithium difluoro(oxalato)borate and lithium tetrafluoro oxalate-phosphate.

15. The non-aqueous electrolyte composition of claim 1, wherein the non-aqueous electrolytic solution comprises: a. ethylene carbonate, dimethyl carbonate and ethylmethyl carbonate; b. $LiPF_6$; c.; lithium bis (fluorosulfonyl) imide and d. at least one of lithium difluoro(oxalato)borate or lithium tetrafluoro oxalate-phosphate.

16. The non-aqueous electrolyte composition according to claim 1 wherein the asymmetric phosphates are selected from the group consisting of lithium tetrafluoro oxalato-phosphate, $LiPF_2[O_2C(CX_2)_nCO_2]_2$, $LiPF_4[O_2C(CX_2)_nCO_2]$, wherein X is selected from the group consisting of H, F, Cl, $C_1$-$C_4$ alkyl groups and fluorinated alkyl groups, and n=0-4 and mixtures thereof.

* * * * *